United States Patent
Apajalahti et al.

(10) Patent No.: US 10,558,951 B2
(45) Date of Patent: *Feb. 11, 2020

(54) METHOD AND ARRANGEMENT FOR GENERATING EVENT DATA

(71) Applicant: Blucup Ltd., Helsinki (FI)

(72) Inventors: Jaan Apajalahti, Helsinki (FI); Rauli Rikama, Helsinki (FI); Antti Rikkinen, Helsinki (FI)

(73) Assignee: BLUCUP LTD., Helsinki (FI)

( * ) Notice: Subject to any disclaimer, the term of this patent is extended or adjusted under 35 U.S.C. 154(b) by 375 days.

This patent is subject to a terminal disclaimer.

(21) Appl. No.: 15/477,666

(22) Filed: Apr. 3, 2017

(65) Prior Publication Data

US 2017/0206508 A1    Jul. 20, 2017

Related U.S. Application Data

(63) Continuation-in-part of application No. 14/488,787, filed on Sep. 17, 2014, now Pat. No. 9,727,843.

(51) Int. Cl.
| | |
|---|---|
| *G06F 17/30* | (2006.01) |
| *G06Q 10/10* | (2012.01) |
| *G06Q 10/06* | (2012.01) |
| *G06Q 30/02* | (2012.01) |
| *G06N 5/02* | (2006.01) |
| *G06F 16/20* | (2019.01) |

(Continued)

(52) U.S. Cl.
CPC ........ *G06Q 10/1095* (2013.01); *G06F 16/20* (2019.01); *G06F 16/2455* (2019.01); *G06F 16/284* (2019.01); *G06N 5/02* (2013.01); *G06Q 10/06311* (2013.01); *G06Q 10/10* (2013.01); *G06Q 10/103* (2013.01); *G06Q 30/02* (2013.01)

(58) Field of Classification Search
CPC ......... G06Q 10/1095; G06Q 10/06311; G06Q 30/02; G06Q 10/03; G06Q 10/103; G06Q 10/10; G06F 17/30286; G06F 17/30595; G06F 16/2455; G06F 16/284; G06N 5/02
See application file for complete search history.

(56) References Cited

U.S. PATENT DOCUMENTS

| | | | |
|---|---|---|---|
| 9,858,584 B2 * | 1/2018 | Jain | G06Q 30/0201 |
| 10,217,121 B2 * | 2/2019 | Jain | G06Q 30/0201 |

(Continued)

*Primary Examiner* — Jean M Corrielus
(74) *Attorney, Agent, or Firm* — Robert P. Michal, Esq.; Carter, DeLuca & Farrell LLP

(57) ABSTRACT

A method and arrangement for generating event data from e.g. a meeting. A management system, an event template repository and a user equipment is provided. The management system is preferably a CRM system and is arranged to manage customer related information. The even template repository stores template information comprising at least one input query corresponding to customer information and having a plurality of associated input values, and input interpretation information for determining an input value and an action for each input value. The user equipment, having at least a display and an input capturing device, presents the user with an input query and captures a user input in response. At least one user input is a non-contact input which is captured by a suitable capturing device. An input value and an action is determined for each user in accordance with input interpretation information. Furthermore, the determined action is executed.

43 Claims, 2 Drawing Sheets

(51) Int. Cl.
*G06F 16/28* (2019.01)
*G06F 16/2455* (2019.01)

(56) References Cited

U.S. PATENT DOCUMENTS

| | | | | |
|---|---|---|---|---|
| 2002/0023109 | A1* | 2/2002 | Lederer, Jr. | G06Q 10/10 |
| | | | | 715/255 |
| 2003/0144873 | A1* | 7/2003 | Keshel | G06Q 30/02 |
| | | | | 705/1.1 |
| 2011/0025842 | A1* | 2/2011 | King | G06F 17/211 |
| | | | | 348/E7.085 |
| 2012/0035934 | A1* | 2/2012 | Cunningham | G06F 1/1639 |
| | | | | 704/260 |
| 2013/0307842 | A1* | 11/2013 | Grinberg | G06F 3/1431 |
| | | | | 345/419 |
| 2014/0337093 | A1* | 11/2014 | Jain | G06Q 30/0201 |
| | | | | 705/7.29 |
| 2014/0376712 | A1* | 12/2014 | Mondri | H04M 3/5133 |
| | | | | 379/265.09 |
| 2014/0380190 | A1 | 12/2014 | Mondri et al. | |
| 2016/0035082 | A1* | 2/2016 | King | H04N 1/19594 |
| | | | | 348/135 |
| 2018/0096366 | A1* | 4/2018 | Jain | G06Q 30/0201 |
| 2018/0211395 | A1* | 7/2018 | King | G06F 16/434 |

\* cited by examiner

METHOD AND ARRANGEMENT FOR GENERATING EVENT DATA

CROSS-REFERENCE TO RELATED APPLICATION

This is a Continuation-in-Part of U.S. patent application Ser. No. 14/488,787 filed Sep. 17, 2014, the entire disclosure of which is incorporated herein by reference.

TECHNICAL FIELD

The present invention relates to a method and an arrangement for generating event data. More particularly, event data is generated based on user inputs in response to input queries.

BRIEF BACKGROUND OF THE INVENTION

Events, such as meetings are commonly used for interacting and sharing information between participants. For such an event to be productive, the contents, results and decisions discussed, and actions to follow should be well documented and put into action. For the documentation to be complete, it should be made during the event so that details are not forgotten later on. Traditionally documentation has been done using a pen and paper or a computer during a meeting by one of the participants. However, detailed documentation may draw attention from the meeting itself, thus resulting in a low-quality documentation and/or meeting. In a meeting with many participants, a single person may be chosen to focus on solely composing the documentation, but in smaller meetings this is often not a feasible option. Additionally, the contents of the documentation often has to be exported into different systems separately afterwards, which is often complex and time consuming.

BRIEF SUMMARY OF THE INVENTION

It is an object of the present invention is to provide a method and an arrangement enabling a participant of an event to quickly and efficiently document the contents of the event by entering user inputs in response to input queries presented by a user equipment.

In accordance with an aspect of the present invention, there is provided a method for generating event data. The method is a process comprising the steps of:
providing a management system arranged to transmit, receive and store customer related information of at least one customer, said customer related information comprising at least one event data field;
providing an event template repository arranged to transmit, receive and store template information of at least one event template, said template information comprising:
at least one input query, corresponding to said at least one event data field of the customer related information of the management system, and having a plurality of associated input values; wherein said at least one input query comprises a representation of said plurality of input values, and wherein said user input is a non-contact input gesture corresponding to said graphical representation;
input interpretation information for each input query, said input interpretation information associating a user input to an input value from the plurality input values, and associating said user input to at least one action;
providing a user equipment having at least a display and an input capturing device;
presenting said at least one input query with the display of the user equipment;
capturing a user input in response to said at least one input query with the input capturing device, determining an input value for each user input in accordance with the input interpretation information; and
executing at least one action for each user input in accordance with the input interpretation information.

In accordance with a second aspect of the present invention, there is provided an arrangement for generating a structured report of an event, the arrangement comprising:
a network interface;
a management system arranged to store customer related information of at least one customer, and to transmit and receive said customer related information via the network interface, said customer related information comprising at least one event data field;
an event template repository arranged to store template information of at least one event template, and to transmit and receive said template information via the network interface, said template information comprising:
at least one input query, corresponding to said at least one event data field of the customer related information of the management system, and having a plurality of associated input values;
input interpretation information for each input query, said input interpretation information associating a user input to an input value from the plurality input values, and associating said user input to at least one action;
a user equipment having at least a memory, a processor, a display and an input capturing device, said user equipment being arranged to transmit and receive data via the network interface, wherein the user equipment is configured to:
present said at least one input query with the display of the user equipment, wherein the display is arranged to represent a representation of said plurality of input values of said at least one input query, and wherein said input capturing device is arranged to capture a non-contact input gesture corresponding to said representation,
capture a user input in response to said at least one input query with the input capturing device, determine an input value for each user input in accordance with the input interpretation information; and
execute at least one action for each user input in accordance with the input interpretation information.

In accordance with a third aspect of the present invention, there is provided an arrangement for generating a structured report of an event, the arrangement comprising:
a processor, a memory, a display, an input capturing device and a network interface, said processor, memory, display, input capturing device and network interface being in communication with each other, wherein the memory has instructions for causing the processor to execute the steps of:
providing a management system arranged to transmit, receive and store customer related information of at least one customer, said customer related information comprising at least one event data field;
providing an event template repository arranged to transmit, receive and store template information of at least one event template, said template information comprising:
at least one input query, corresponding to said at least one event data field of the customer related information of the management system, and having a plurality of associated input values;
input interpretation information for each input query, said input interpretation information associating a user input to an input value from the plurality input values, and associating said user input to at least one action;

providing a user equipment having at least a display, wherein the display is arranged to represent a representation of said plurality of input values of said at least one input query, and wherein said input capturing device is arranged to capture a non-contact input gesture corresponding to said representation, providing an input capturing device;

presenting said at least one input query with the display means of the user equipment;

capturing a user input in response to said at least one input query with the input capturing device, determining an input value for each user input in accordance with the input interpretation information; and executing at least one action for each input in accordance with the input interpretation information.

Thus, the present invention enables event data to be generated during a meeting without distracting the participants away from the topics being discussed. Furthermore, as the contents of the event may be presented as a report having a predefined structure, the need
to translate a verbal description into a form that can be exported to a management system, is eliminated.

BRIEF DESCRIPTION OF THE DRAWINGS

Hereafter, the present invention is discussed in detail with reference to the following figures, in which.

DETAILED DESCRIPTION

Figure 1:
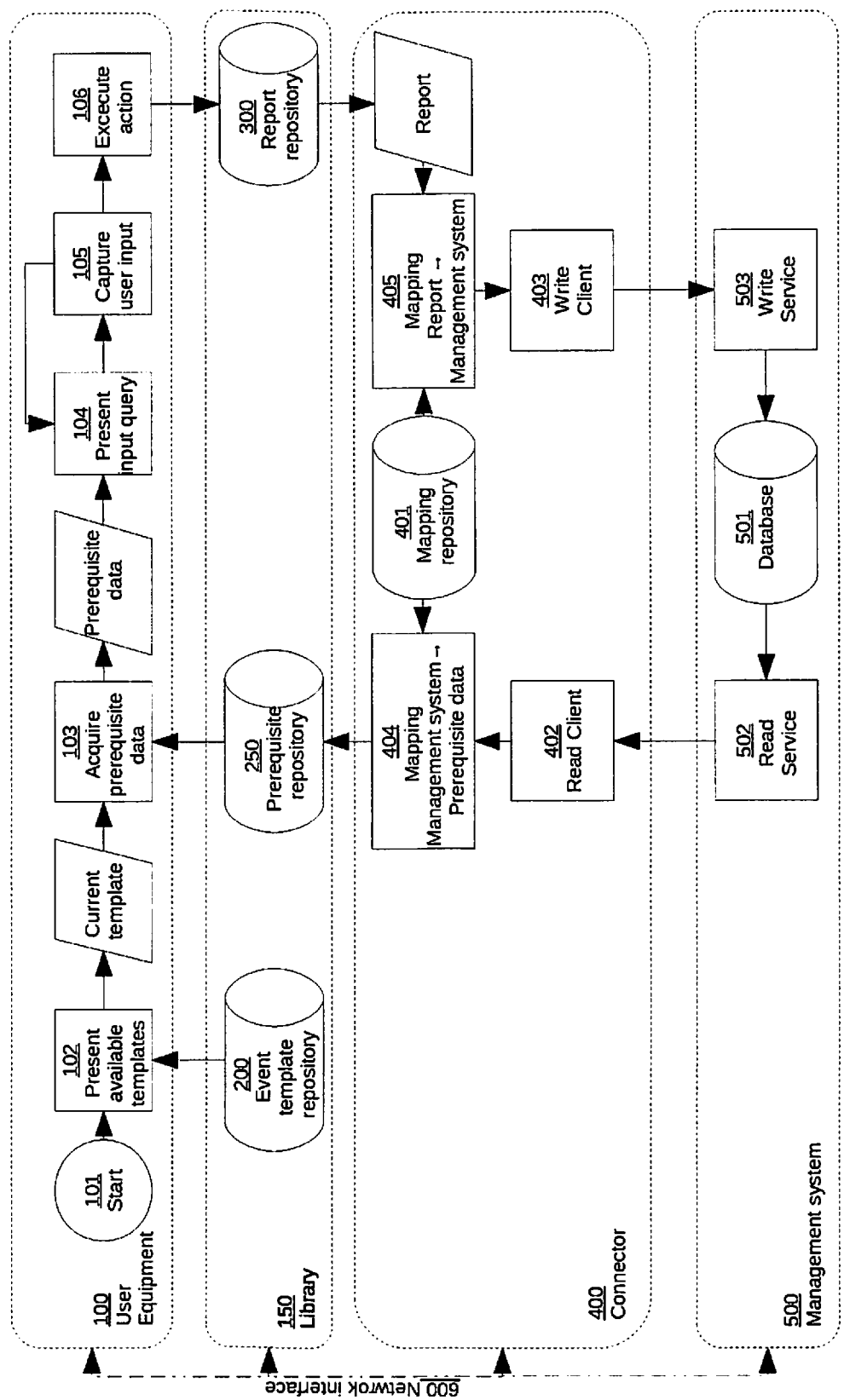
FIG. 1 is a flowchart illustrating an overview of an embodiment of the present invention.

In the overview of FIG. 1, a user equipment 100, an event template repository 200, and a management system 500, are provided. Also, a network interface 600 is provided, thus enabling communication between each of the entities.

The management system 500 comprises a database 501 for storing customer related information of at least one customer. More specifically, customer related information of each customer may comprise event data fields for storing event specific data and customer data fields for storing customer specific data.

Furthermore, the management system comprises a read service 502 allowing transmitting information and a write service 503 allowing receiving information through an application programming interface (API) of the management system In the embodiment of FIG. 1, the user equipment 100 communicates with the CRM system 500 via an application in the user equipment using a connector which has a read client 402 and a write client 403 configured to communicate with the application programming interface (API) of the CRM system 500. The connector 400 further comprises a mapping repository 401 which contains information allowing the corresponding template information and customer related information to be mapped, i.e. associated, to each other.

Further in FIG. 1, an event template repository 200 stores template information of available event templates and is able to transmit template information to the user equipment 100. A report repository 300 stores reports generated by the user equipment 100, and is thus able to receive reports from the user equipment 100, and further, able to transmit reports to the connector 400. Also, a prerequisite repository 250 is provided to store customer related information, preferably customer data, and being able to receive customer related information from the management system 500 via the connector 400, and further, to transmit customer related information to the user equipment 100. In the embodiment of FIG. 1, each of the repositories are stored on a library 150 which can communicate via the network interface 600.

Step 101 represents the instant at which a user initiates the method according to an embodiment of the invention. The user equipment 100 presents 102 the user with event templates available at the event template repository 200. The user chooses a template from the available templates to be used as a current template by entering a user input indicative of an event template to be used as a current template. Advantageously, the user equipment 100 acquires template information of the current template from the event template repository 200, preferably via the network interface 600.

In step 103, the user identifies at least one participant, who is participating in the event and corresponds to at least one customer in the management system 500. The user equipment 100 may, for example, acquire a list of customers from the management system 500 and present this list to the user as a list of possible participants. The user equipment 100 then captures a user input indicative of at least participant and interprets the user input or send it for interpretation to a remote server and receives the interpreted input. Next, the user equipment 100 [and] acquires customer related information of the at least one participant from the CRM system 500. Customer related information may be transmitted to the user equipment 100 by the prerequisite repository 250, which in turn acquires the customer related information from the CRM database 501 using the connector 400. Customer related information is fetched by the connector read client 402 communicating with the read service 502, the customer related information being mapped 404 to corresponding prerequisite data fields of the current template using the mapping repository 401 information. The acquired customer related information, particularly customer data, is then preferably stored by the user equipment.

In step 104, the user equipment 100 presents an input query from the at least one series of input queries. In step 105, the user responds to the presented input query using an input capturing device and the user equipment 100 captures the user input in the form of one or more user input values in response to the input query.

The interpretation of the user input for choosing the customer, for choosing the template or for filling in the template and input query may be performed by the user equipment itself or the user equipment might use an external server (not shown in FIG. 1) in order to convert the user input into a form to be understood and handled by the application in the user equipment 100 so that the current template and input query could be filled in.

An external server might especially be used, when the user responds to the input query by some hands-free/non-contact technology. The different alternative ways that can be used by the user for the responding and the various capturing devices to be used for the capturing of the user input generally and the interpretation of that are presented later in this document.

Steps 104 and 105 are then repeated for each input query of the at least one series of input queries.

In step 106, the user equipment 100 executes an action in accordance with input interpretation information, namely generates a structured report based on the template information of the current template, said at least one input value and possible prerequisite data. The structure of the report may be pre-defined either commonly for all templates or separately for each template. Further, the user equipment 100 transmits the generated report to the report repository 300, from which it is sent to the connector 400. At the connector, information contained within the report is mapped 405 to corresponding information at the management system 500 using mapping repository 401 information, and further, sent to the database 501 using the client 403 communicating with the write service 503.

Figure 2C:
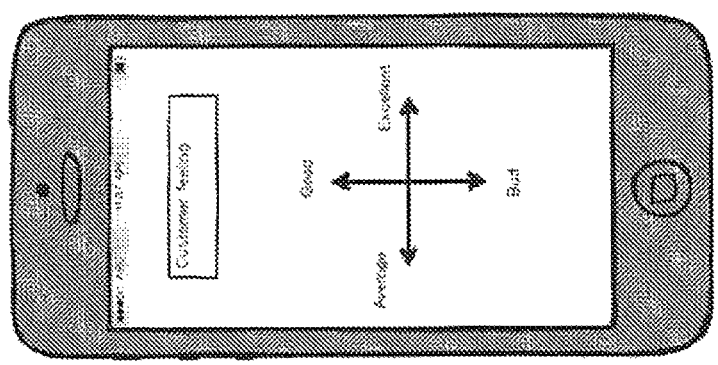
FIGS. 2a, 2b and 2c illustrate different exemplary graphical representations of input values.
Figure 2B:
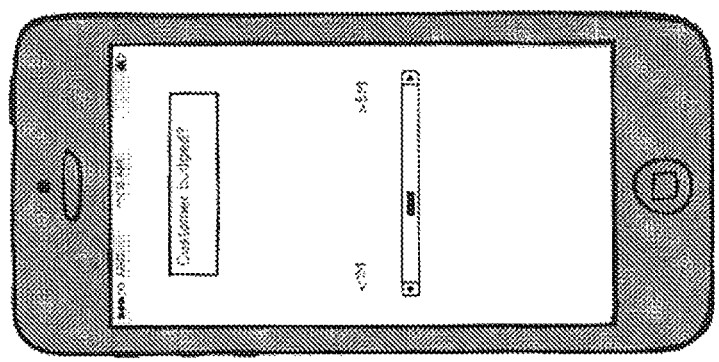
Figure 2A:
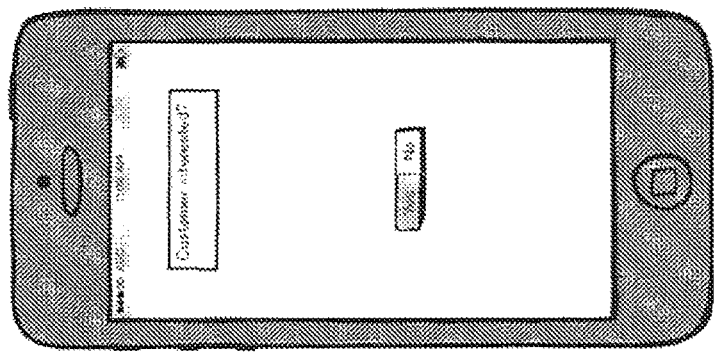

FIG. 2a-2c illustrate exemplary situations in which an input query is presented by the user equipment 100 and the plurality of input values associated to the input query are displayed as graphical representations.

In FIG. 2a, an input query associated to discrete input values is displayed. Two discrete input values (Yes/No) are represented as graphical buttons, intuitively leading the user to enter or indicate the desired input value.

The user might enter the desired input value e.g. by pressing on the corresponding button, or indicate the desired input value by a voice command (e.g. by saying yes or no), by a certain motion gesture, by gazing or by some other non-contact or hands-free technology.

In FIG. 2b, an input query associated with a numerical, i.e. no-discrete input value is displayed. The numerical input value is represented as a graphical scroll bar, intuitively leading the user to move the scroll bar to a position corresponding to a desired input value by sliding his finger on top of the scroll bar, by one or more voice commands, by one or more motion gestures, by gazing or by some other non-contact or hands-free technology.

In FIG. 2c, an input query associated to alternative discrete input values is displayed. Four discrete input values (Average/Good/Excellent/Bad) are represented as two orthogonal axis each having two directions indicated with arrows, thus implying four distinctive directions. Each direction represents an input value, which intuitively leads the user to enter the desired input value by swiping or sliding his finger in the direction of the desired input value, by one or more voice commands, by one or more motion gestures in the direction of the desired input value, or by gazing in the direction of the desired input value gazing or by some other non-contact or hands-free technology.

In some embodiments, the user can choose among two or more different alternative ways how to enter or indicate the desired input value in the different places or fields of the current template or input query or how to choose the customer and the template to be used.

Thus, alternative user input technologies, such as those performed by swiping, touching or speech, work together or separately. The whole process (from choosing a customer and template all the way to filling in the input query) can be performed with only one user input technology or different user input technologies can be performed so that some input steps are performed with one user input technology and some other, i.e. the rest of, the user inputs with another user input technology. In each step, any input technology can be used.

The application in the user equipment can e.g. be installed to listen for and recognize speech input as soon as the application) is ready for use without user intervention. It is preferable that alternative input types are allowed, which is especially helpful for handling repeated recognition failures. In such situations, the user can e.g. use another approach instead, i,e use a keyboard, or use touch or a mouse to select from a list of potential matches.

In other embodiments, only one or a restricted number of input technologies are available. An example of such an embodiment can e.g. be an embodiment, in which augmented reality glasses are used for displaying the information and the input is given by voice, gaze or hover gestures. There are also embodiments of reality glasses, wherein only a user input by touch maybe used. The hardware components involved in the process are a processor, means for display, sensors and input devices. The types of these components are dependent on the used input technology, capturing method and the way of presentation.

Examples of various input technologies that can be used in the invention in connection with a number of different displaying technologies and means are presented more in detail later on in this document.

Thus, there are different ways in which information throughout the process can be presented by the user equipment 100 and how the plurality of input values associated to the input query are displayed as graphical representations, and for example when the user equipment 100 presents 102 available event templates for the user and when the user equipment 100 presents a list of customers to the user as a list of possible participants.

Useful display means cover conventional or electronic displays, monitors, display screens, touchscreens, projection screens, optical systems, hand held devices, and display systems worn on the human body or any other useful output device or viewing surface for presentation of information in visual or tactile form.

One way is to present the information on an electronic display or a full-area 2- or 3-dimensional display, in connection to a computer, mobile device, smart telephone, lap top, or the like. Video displays are especially used in head-mounted displays. Different underlying technologies are used in the various displays.

Another display alternative is a virtual touch screen (VTS), which is a user interface system that augments virtual objects into reality through an optical display using sensors to track and capture a user's visual and/or physical interaction with the object.

By using virtual reality (VR) or augmented reality (AR) technology, images used in the templates presented in the process of the invention can be generated by computer technologies that use software. The images become interactive and can be digitally manipulated with additional information in accordance with the user input.

AR displays can be rendered on devices resembling eyeglasses, such as augmented reality glasses or virtual reality glasses, that employ cameras or other sensors to intercept a user input and re-display its converted view as interpreted information.

The invention might make use of smart glasses, which are wearable computer glasses that present information or add information alongside or to what the wearer sees so they can be used in the invention for displaying the information of the process. The invention can e.g. make use of smart glasses that are effectively wearable computers which can run the mobile application of the invention self-contained, are handsfree and can communicate with the management system via e.g. natural language voice commands or touch buttons or other type of user input.

Display systems worn on the human body can be used for the augmentation, such as an optical head-mounted display (OHMD) or embedded wireless glasses with a transparent heads-up display (HUD) or with an augmented reality (AR) overlay that has the capability of reflecting projected digital images. A head-mounted display HMD, is a display device, worn on the head that has a small display optic in front of one or each eye. Suitable input capturing devices for the head-mounted displays are those working with mobility and/or hands-free use, for example touchpad or buttons, compatible devices (e.g. smartphones or control units) for remote control, speech recognition or voice commands, hands or body gesture recognition, eye tracking and/or brain—computer interfaces.

Instead of eyeglasses, contact lenses might be used. The elements for display embedded into such lenses might include integrated circuitry, Light Emitting Diodes (LEDs) and an antenna for wireless communication.

Also virtual displays of early models that can perform basic tasks can be used, such as just serve as a front end display for a remote system, as in the case of smart glasses utilizing cellular technology or Wi-Fi.

A further display alternative is a virtual retinal display (VRD) using a display technology that draws a raster display directly onto the retina of the eye. The user sees what appears to be a conventional display floating in space in front of them.

Spatial Augmented Reality (SAR) augments real world objects and scenes without the use of special displays. SAR makes use of digital projectors to display graphical information onto physical objects, such as walls or tables. In this display technology, the display is separated from the users of the system.

In this document, the world "display" includes all kinds of display means for displaying or presentation of information, including and especially those using the above mentioned display technologies.

Mobile augmented-reality systems with digital cameras and/or other optical sensors, accelerometers, Global Positioning System (GPS) sensors, gyroscopes, solid state compasses, Radio Frequency IDentification (RFID) sensors, Micro Electro Mechanical Systems (MEMS) sensors and other wireless sensors for tracking and capturing user input can also be used. The most important in such systems is the position and orientation of the user's head. E.g. tracking the user's hand(s) or using a handheld input device can provide an interaction technique. Other capturing techniques in such systems include speech recognition systems that translate a user's spoken words into computer instructions and gesture recognition systems that can interpret a user's body movements by visual detection or from sensors embedded in a peripheral device.

The computer analyzes the sensed visual and other data to synthesize and position augmentations.

Input capturing techniques to be used in the invention generally are further discussed later in this document.

Hereafter, a method according to an embodiment of the invention is described in operation. Firstly, a network interface 600 is provided. The network interface 600 provides communication between the each of the entities described hereafter. Any kind of network interface may be used, but preferably the entities can communicate with each other via the internet.

A management system 500 is also provided, the management system being arranged to store customer related information of at least one customer. The customer related information comprises at least one event data field. The at least one event data field is envisaged to store a value representing information discussed in the event. Examples of such information are customer interest, customer budget value, customer feeling, customer hopes and intentions, future events and dates thereof, etc.

Advantageously, said customer related information also comprises at least one customer data field. The at least one customer data field is envisaged to store a value representing more general information related to the customer, which is possibly already known prior to the event. Examples of such information are customer account, customer contact, opportunity type, lead type, information concerning previous interactions with customer etc. Preferably, customer related information is stored in a database 501 of the management system 500 and can be transferred or received via a network interface 600 using a read service 502 or a write service 503, respectively.

Naturally, the management system 500 may comprise other functionalities, and the database 501 may comprise other information and data fields. Examples of such management systems are, e.g., customer relationship management (CRM) systems, enterprise resource planning (ERP) systems, and the like. Such management systems are commercially widely available from multiple vendors, such as Microsoft Corporation, Salesforce.com Inc., SAP SE, and Oracle Corporation. The present invention is particularly suitable to be implemented using a management system for managing interactions with current and future customers, i.e. a CRM system.

It should be noted that in the context of this application, the term customer should not be interpreted in the restrictive sense of a party in a commercial transaction. Rather, the term customer should be understood as any party of interest which may be envisaged to participate in an event from which data is generated.

A user equipment 100 is also provided, the user equipment 100 having at least a processor, a memory, a display and an input capturing device. The user equipment is also arranged receive and transmit information via the network interface 600. Preferably, the user equipment 100 is a mobile device such as a mobile phone, a tablet computer or a laptop computer. Suitably, the user equipment is arranged to store computer-readable instructions which, when executed by the processor, cause the user equipment 100 to perform a method according to any embodiment of the present invention.

One type of a useful input capturing device of the user equipment is capable of capturing gestures, such as a hands-free or non-contact movement of or pressing with or touching with, the arms, hands, fingers, or other body part of the user. Examples of such input capturing devices are touchpads, touchscreen, different types of motion detectors such as camera-based or infra-red based motion sensors. All kinds of gestures may be used as user inputs, including e.g. pointing, sliding, pinching and rotating motions with the fingers of the user. Mobile devices with suitable input capturing devices are readily available, and one input capturing device of the user equipment 100 that is capable of capturing gestures is a touch screen or a non-contact capturing device.

Hands-free computing generally is any computer configuration where a user can interface without the use of their hands, an otherwise common requirement of human interface devices such as the mouse and keyboard. Hands-free computing can range from using the eyes, tongue, lips, mouth, or movement of the head or other body part to voice activated interfaces utilizing speech recognition software and a microphone or bluetooth or other non-contact technology. Here the term hands-free input is thus meant to cover also all non-contact input methods, wherein no physical contact with the user equipment and its screen is needed.

Examples of available hands-free computing devices to be used include different joystick types, camera based head tracking systems and means for speech recognition. Some joystick types require no physical connections to the user. Camera types require targets mounted on the user that is sensed by the camera and associated software.

In some embodiments, the invention makes use of hands-free/non-contact computing that performs Speech Recognition (SR), which is a technology that enables the recognition and translation of spoken language into text by computers. It is also known as "automatic speech recognition" (ASR), "computer speech recognition", or just "speech to text" (STT). Especially, the speech recognition is in the invention trained to recognize specific commands.

A type of a useful input capturing device of the user equipment is thus capable of capturing audio caused by the user by voice or speech of the user or by causing a sound in another way. When such type of a capturing device is used, the speech recognition provides the input and specify the desired action or command in the input query to accomplish the tasks.

When speech recognition is used as input in the invention, the user equipment has a microphone or the equivalent. The user equipment is then a device with microphone capability and has access to the microphone's audio feed. This allows the application in the user equipment to record audio from connected microphones. The application can dependent on embodiment recognize words, phrases (vocabulary) or natural language in speech or voice input.

The speech recognition can be performed by a remote web service, such as a cloud service, in an external server and the results are returned to the user equipment. Commercial speech recognition systems in the form of such services are available and can be used in the invention for the conversion of speech into text. Such a system can be a kind of an Application Programming Interfaces (API) that transcribe the text of users dictating to the application's microphone and that enable command-and-control through voice cases. The converted result can directly be entered into the input query.

A further type of an input capturing device useful in the invention is capable of capturing the point of gaze (where one is looking) or the motion of an eye relative to the head, such as an eye tracker. An eye tracker is a device for measuring eye positions and eye movement.

Either the point of gaze (where one is looking) or the motion of an eye relative to the head is measured in the eye tracking. Here gaze is seen to be a kind of an eye gesture, why the term input gesture covers the term gaze. There are a number of methods for measuring eye movement or gaze, which can be used in the invention. The most popular variant uses video images from which the eye position is extracted. Other methods use search coils or are based on the electrooculogram.

The most useful eye tracking methods use video-based eye trackers. A camera focuses on one or both eyes and records their movement as the viewer looks at a target in the template. In an active light solution, the eye-tracker uses the center of the pupil and infrared/near-infrared non-collimated light to create corneal reflections (CR). The vector between the pupil center and the corneal reflections can be used to compute the point of regard on surface or the gaze direction. Another useful method is known as passive light, wherein visible light is used for the illumination.

The interpretation of the data that is recorded by the various types of eye trackers takes place with software that animates or visually represents it, so that the visual behavior of one or more users can be graphically resumed.

The user equipment 100 may communicate directly with the management system 500 via the network interface 600. However, as many different commercial management systems are available, it is preferable that the user equipment utilizes a connector 400 through which it communicates with the management system 500. In this way, the same user equipment 100 may be used for different management systems 500 by providing one or more connectors 400, each customized for a specific management system 500. A connector comprises a mapping repository 401 which contains information enabling data fields of the management database 501 to be associated to corresponding prerequisite data, required by the user equipment. Respectively, the mapping repository 401 also contains information enabling data related to the event to be associated to data fields of the management database 501. Preferably, the mapping repository 401 contains information for associating customer data field of the management system to prerequisite data field of the event templates, and respectively, for associating input values of a report to event data fields of the management system 500.

When a user initiates the method, the user equipment 100 presents 102 the user with available event templates and captures a user input indicative of a current template, which is an event template chosen from the available event templates. Available event templates are stored in an event template repository 200, advantageously on a remote server 150 or a library accessible to the user equipment 100 via a network interface 600. Alternatively, the event template repository may be locally stored by the user equipment 100 and synchronized with a remote event template repository. Preferably, the user equipment 100 stores a local copy of all or at least some of the available event templates for facilitating use when a network interface 600 is temporarily not available.

After the current template has been chosen, i.e. information indicative of the current template has been captured, the user equipment acquires template information of the current template from the event template repository 200 or from a local copy thereof. Said template information comprises at least one input query corresponding to the at least one event data field of the customer related information stored by the management system 500. Like the event data field, the input query is envisaged to represent a topic to be discussed at the event. Each input query has a plurality of associated input values, i.e. possible answer options. Particularly, an input query may be a question, statement, or a claim, whereas the associated input values may be [an] answers or responses thereto. The template information also comprises input interpretation information that associates a user input to an input value from the plurality of input values. The input interpretation information also associates each user input to at least one action. Examples of such actions are generating a textual representation of the input value, or storing an input value to the management system 500, suitably to the event data field that corresponds to the input query associated to the input values. Other examples of possible actions are, e.g. generating a report including at least some of the input values, their textual representation, or both. Said actions may also include, for example, sending a generated report to a report repository, the management system 500, or one of the participants, setting up a following event, etc.

The template information preferably further comprises at least one prerequisite data field corresponding to at least one data field of a customer in the management system 500, suitably a customer data field. Said at least one prerequisite data field thus determines which customer related information of the management system 500, particularly customer data fields, are required by the template.

Preferably, the user equipment 100 also captures an input indicative of at least one participant of the event. This could be done before or after choosing the current template. Advantageously, the user is presented with a list of at least some of the customers in the management system 500, the user then choosing the at least one participant from the list. Prerequisite data, i.e. customer related information, such as at least one customer data field of the at least one participant, is then acquired by the user equipment as determined by the at least prerequisite data field of the current template.

Prerequisite data may be acquired either from the management system 500 via the network interface 600 or from a prerequisite repository 250. The prerequisite repository 250 is advantageously stored locally by the user equipment 100, thus facilitating operation when a network interface 600 is temporarily not available. The prerequisite repository may then be synchronized with the management system 500 when the network interface is available again. Advantageously, the prerequisite repository 250 stores at least partially the customer data fields of the customers in the management system 500.

During the event, the user equipment presents 104 the user with an input query and captures 105 user inputs in response to said input query. The user equipment 100 then determines an input value for the user input in accordance with the input interpretation information (as interpreted in one of the above presented ways) and executes 106 the at least one action associated with the user input. This is then repeated for each of the input queries. It should be noted that multiple user inputs may be captured in response to a single input query, and thus, multiple input values may be determined for each input query. Furthermore, multiple actions may be determined by the input interpretation information even for a single user input.

Suitably, at least one input query comprises a graphical representation of said plurality of input values. Preferably, all input values have a graphical representation corresponding to a user input that is associated to the input value by the input interpretation information.

As previously mentioned, one useful type of input capturing device is capable of capturing gestures. Subsequently, at least one user input is preferably a gesture captured by the input capturing device. All or apart of user inputs in response to input queries might be gestures.

All kinds of gestures may be used as user inputs, including pointing, sliding, pinching and rotating motions with the fingers of the user.

For example, pointing gestures have proved to be suitable user inputs in response to input queries associated to one or more discrete input values, such as illustrated in FIG. 2*a*. Although not the case in FIG. 2*a*, it should be noted that discrete input values need not be exclusive options. Sliding or swiping gestures have proven suitable user inputs for non-discrete input values, such as numerical values or ranges, as illustrated in FIG. 2*b*. In the case of a range type input value, a gesture may be used to broaden or reduce the scope of the range, or alternatively, each endpoint of the range may be input separately. Sliding or swiping gestures have also proven suitable user inputs for discrete input values, particularly when the discrete input values have been graphically represented as an element indicating a direction, such as an axis or an arrow, such as illustrated in FIG. 2*c*.

Furthermore, rotation and pinching gestures have also proven suitable user inputs for non-discrete input values such as numerical values or ranges. An example of such a rotation gesture is moving two fingers relative to each other such that one finger rotates about another, or the fingers rotate about a common axis. An example of such a pinching gestures is moving two fingers towards or away from each other.

Hands-free/non-contact user input is an alternative but can in many cases be the best way to perform the user input. It speeds up the interaction with the input query, and the user can use his hands for other things simultaneously. Hands-free/non-contact computing is important because it is useful to both able and disabled users and may also be useful while driving.

As was presented above, the capturing device can in the invention capture hands-free and non-contact user input performed by the user by finger, mouth, head or eye motions or gestures or by moving some other body part.

Further hands-free/non-contact user input might be performed by the user by speech or some other voice (such as a certain voice action programmed to be interpreted as a certain input value, or by gazing.

Still further, hands-free/non-contact user input might be performed by a hands-free joystick or other corresponding means.

Advantageously, after capturing 105 user inputs in response to presenting input queries 104, a report is generated 106, suitably by the user equipment 100. Preferably, the report comprises at least some of the input values determined in connection of at least some of the input queries. The report may additionally include other information, such as pre-requisite data, the outcomes of the actions associated to the input values, or both.

The report could, for example, be a listing of input values, a textual representation of the input values, or both. Preferably, the report is of a pre-defined structured form, wherein the form and structure may be defined, e.g. commonly for all event templates or separately for each event template. The report is then stored in a report repository 300, advantageously on a remote server 150 or a library accessible to the user equipment 100 via the network interface 600. Alternatively, the report repository 300 may be locally stored by the user equipment 100 and synchronized with a remote repository. Preferably, the user equipment 100 is arranged to store the generated report locally and transmit the report to the report repository 300 when a network interface is available, thus enabling operation while offline.

The report may then be transmitted from the report repository 300 to the management system 500 to be stored as such, or preferably, to be incorporated within the database 501. Alternatively, or in addition to this, the report may also be sent, for example, via e-mail to the at least one participant of the event. It is also possible that multiple reports are generated for different purposes. For example, a report comprising a structured textual representation of the input values may be sent to the at least one participant of the event, and another report comprising a structured listing of the input values may be sent to the management system 500 to be incorporated within the management database 501. Preferably, this is done using the connector 400 which is arranged to associate 405 the contents of the report to respective data fields of the database 501 using the mapping repository 401 information. The connector 400 is then able to transmit the contents of the report to the associated data fields of the management database 501 using the write client 403 that communicates with the write service 503 through the API of the management system 500.

For example, when a report comprising at least one input value, captured in response to at least one input query, is transmitted to the connector 400, the event data field of the management system 500 corresponding to the input query associated to the input value is determined using information of the mapping repository 401. In other words, each input value of a report received by the connector is mapped 405 to the corresponding event data field of the management system 500. Naturally, other information contained within the report, such as prerequisite data and/or customer data, may be mapped to a corresponding data field of the management system 500. The write client 403 then stores at least a part of the information contained within the report in respective data fields of the management database 501 in accordance with the mapping repository 401 information.

A person skilled in the art will appreciate that the method and arrangement according to the present invention may be implemented using an arrangement comprising a processor, a memory, a display, an input capturing device and a network interface, wherein the processor, memory, display, input capturing device and network interface are in communication with each other. In such an arrangement, the memory has instructions for causing the processor to execute the steps of a method according to any embodiment of the invention as described above.

Particularly, a mobile device and one or more servers each storing software code which, when executed, cause the mobile device and one or more servers to act as the user equipment 100 and management system 500, respectively, and to perform the method. Moreover, the management system 500, the connector 400 and each of the repositories 200, 250, 300 may be implemented as software modules, i.e. as instruction executed at the mobile device at the one or more servers.

The invention claimed is:

1. A method for generating event data, comprising the steps of:
   providing a management system arranged to transmit, receive and store customer related information of at least one customer, said customer related information comprising at least one event data field;
   providing an event template repository arranged to transmit, receive and store template information of at least one event template, said template information comprising:
   at least one input query, corresponding to said at least one event data field of the customer related information of the management system, and having a plurality of associated input values;
   wherein said at least one input query comprises a representation of said plurality of input values, and wherein said user input is a non-contact input gesture corresponding to said graphical representation;
   input interpretation information for each input query, said input interpretation information associating a user input to an input value from the plurality input values, and associating said user input to at least one action;
   providing a user equipment having at least a display and an input capturing device;
   presenting said at least one input query with the display means of the user equipment;
   capturing a user input in response to said at least one input query with the input capturing device,
   determining an input value for each user input in accordance with the input interpretation information; and
   executing at least one action for each input in accordance with the input interpretation information, and wherein:
   said customer related information of the management system further comprises at least one customer data field,
   said template information further comprises at least one prerequisite data field, and
   the method further comprising the steps of:
   capturing, with the input capturing device, a user input indicative of an event template to be used as a current template, and acquiring template information of the current template from the event template repository;
   capturing, with the input capturing device, a user input indicative of at least one participant of the event corresponding to the at least one customer in the management system, and acquiring said at least one customer data field of the at least one participant from the management system based on the at least one prerequisite data field of the current template,
   wherein said at least one input query and said input interpretation information are of the current template, and
   wherein said at least one action comprises:
   storing at least one input value to the event data field of the management system corresponding to the input query associated to each of the input values; and/or
   generating a report including a textual representation of at least one input value, the acquired at least one customer data field, or both, and storing said report in a report repository.

2. The method of claim 1, further comprising the steps of:
   providing a connector comprising a mapping repository having information for associating input values to corresponding event data fields of the management system
   wherein, said at least one action comprises storing at least one input value to the event data field of the management system as associated by the mapping repository.

3. The method of claim 1, wherein said at least one input query comprises a graphical representation of said plurality of input values.

4. The method of claim 1, wherein the user input is interpreted by an application in the user equipment.

5. The method of claim 1, wherein the user input is sent to a remote server for interpretation, where after the interpreted input is received by the user equipment as interpretation information.

6. The method of claim 1, wherein one or more input steps are performed with one user input technology and the rest of the user inputs with another user input technology.

7. The method of claim 1, wherein said user input is a motion gesture performed by the movement of a body part or a gaze corresponding to said representation and the input capturing device is a non-contact camera-based or infra-red based motion sensor.

8. The method of claim 1, wherein said user input gesture is a motion gesture performed by the movement of a body part corresponding to said representation and the input capturing device is a digital camera, video camera, a sensor utilizing the Micro Electro Mechanical Systems, MEMS, sensor, accelerometer, a sensor utilizing the Global Positioning System, GPS, a sensor utilizing Radio Frequency Identification, RFID, a solid state compass or any wireless sensor.

9. The method of claim 1, wherein said user input performed by a non-contact input gesture is interpreted by eye tracking that provides the input and specify the desired action or command in the input query.

10. The method of claim 1, wherein said user input is performed by gazing or by eye movement and the input capturing device is an eye tracker for measuring eye positions and/or eye movement.

11. The method of claim 10, wherein the eye tracker is a video-based eye tracker.

12. The method of claim 11, wherein the interpretation of the user input recorded by the eye tracker is performed with software that converts it to an animated, visually, or textually presented user input value in the input query.

13. The method of claim 11, wherein the interpretation of the user input recorded by the eye tracker is performed with software that converts it to an animated, visually, or textually presented user input value in the input query.

14. The method of claim 1, wherein the non-contact gesture input is performed in parallel with other input technologies, such as by touching or speech so that the different input steps are performed with different input methods.

15. The method of claim 1, wherein the display is an electronic display.

16. The method of claim 1, wherein a touch-screen is used as the display for input steps performed by touching.

17. The method of claim 1, wherein the display is a two- or three-dimensional display, such as a video display.

18. The method of claim 1, wherein the display is a virtual display or a virtual touch-screen or a graphical presentation performed by a digital or optical projection.

19. The method of claim 1, wherein the display is a head-mounted display or an optical head-mounted display.

20. The method of claim 1, wherein the display consists of smart glasses, virtual reality glasses, augmented reality glasses or contact lenses.

21. The method of claim 1, wherein the display is a virtual retina display.

22. The method of claim 1, wherein said management system is a CRM or ERP system.

23. An arrangement for generating event data, comprising:
a network interface,
a management system arranged to store customer related information of at least one customer, and to transmit and receive said customer related information via the network interface, said customer related information comprising at least one event data field;
an event template repository arranged to store template information of at least one event template, and to transmit and receive said template information via the network interface, said template information comprising:
at least one input query, corresponding to said at least one event data field of the customer related information of the management system, and having a plurality of associated input values;
input interpretation information for each input query, said input interpretation information associating a user input to an input value from the plurality input values, and associating said user input to at least one action;
a user equipment having at least a memory, a processor, a display and an input capturing device, said user equipment being arranged to transmit and receive data via the network interface, wherein the user equipment is configured to:
present said at least one input query with the display of the user equipment, wherein the display is arranged to represent a representation of said plurality of input values of said at least one input query, and wherein said input capturing device is arranged to capture a non-contact input gesture corresponding to said representation,
capture a non-contact user input in response to said at least one input query with the input capturing device,
determine an input value for each user input in accordance with the input interpretation information; and
execute at least one action for each user input in accordance with the input interpretation information, and wherein
said customer related information of the management system further comprises at least one customer data field,
said template information further comprises at least one prerequisite data field, and
the user equipment being further arranged to:
capture, with the input capturing device, a user input indicative of an event template to be used as a current template, and acquire template information of the current template from the event template repository;
capture, with the input capturing device, a user input indicative of at least one participant of the event corresponding to the at least one customer in the management system, and acquire said at least one customer data field of the at least one participant from the management system based on the at least one prerequisite data field of the current template,
wherein said at least one input query and said input interpretation information are of the current template, and
wherein said at least one action comprises:
store at least one input value to the event data field of the management system corresponding to the input query associated to each of the input values; and/or
generate a report including a textual representation of at least one input value, the acquired at least one customer data field, or both, and store said report in a report repository.

24. The arrangement of claim 23 further comprising:
a connector comprising a mapping repository having information for associating input values to corresponding event data fields of the management system
wherein, said connector is further arranged to store at least one input value to the event data field of the management system as associated mapping repository.

25. The arrangement of claim 23, wherein the display is arranged to represent a graphical representation of said plurality of input values of said at least one input query, and wherein said input capturing device is arranged to capture a non-contact gesture corresponding to said graphical representation.

26. The arrangement of claim 23, wherein said user input gesture is a motion gesture performed by the movement of a body part or a gaze corresponding to said representation and the input capturing device is a non-contact camera-based or infra-red based motion sensor.

27. The arrangement of claim 23, wherein said user input gesture is a motion gesture performed by the movement of a body part corresponding to said representation and the input capturing device is a digital camera, video camera, a sensor utilizing the Micro Electro Mechanical Systems, MEMS, sensor, accelerometer, a sensor utilizing the Global Positioning System, GPS, a sensor utilizing Radio Frequency Identification, RFID, a solid state compass or any wireless sensor.

28. The arrangement of claim 23, wherein said user input is gaze or eye movement and the input capturing device is an eye tracker for measuring eye positions and/or eye movement.

29. The arrangement of claim 28, wherein the eye tracker is a video-based eye tracker.

30. The arrangement of claim 29, wherein the arrangement comprises software that interprets the user input recorded by the eye tracker and converts it to an animated, visually, or textually presented user input value in the input query.

31. The arrangement of claim 28, wherein the arrangement comprises software that interprets the user input recorded by the eye tracker and converts it to an animated, visually, or textually presented user input value in the input query.

32. The arrangement of claim 23, wherein the user equipment has an application for interpreting said user input by eye tracking that provides the input and specifies the desired action or command in the input query.

33. The arrangement of claim 32, wherein the arrangement comprises software that interprets the user input recorded by the eye tracker and converts it to an animated, visually, or textually presented user input value in the input query.

34. The arrangement of claim 23, wherein a touch-screen is used as the display and the touch-based input capturing device and wherein said user input is a touch gesture used in parallel with an another user input.

35. The arrangement of claim 23, wherein the display is an electronic display.

36. The arrangement of claim 23, wherein the display is a two- or three-dimensional display, such as a video display.

37. The arrangement of claim 23, wherein the display is a virtual display or a virtual touch-screen or a graphical presentation performed by a digital or optical projection.

38. The arrangement of claim 23, wherein the display is a head-mounted display or an optical head-mounted display.

39. The arrangement of claim 23, wherein the display consists of smart glasses, virtual reality glasses, augmented reality glasses or contact lenses.

40. The arrangement of claim 23, wherein the display is a virtual retina display.

41. The arrangement of claim 40, wherein the eye tracker is a video-based eye tracker.

42. The arrangement of claim 23, wherein said management system is a CRM or ERP system.

43. An arrangement comprising a processor, a memory, a display, an input capturing device and a network interface, said processor, memory, display, input capturing device and network interface being in communication with each other, wherein the memory has instructions for causing the processor to execute the steps of:

providing a management system arranged to transmit, receive and store customer related information of at least one customer, said customer related information comprising at least one event data field;

providing an event template repository arranged to transmit, receive and store template information of at least one event template, said template information comprising:

at least one input query, corresponding to said at least one event data field of the customer related information of the management system, and having a plurality of associated input values;

input interpretation information for each input query, said input interpretation information associating a non-contact user input to an input value from the plurality input values, and associating said user input to at least one action;

providing a user equipment having at least a display, wherein the display is arranged to represent a representation of said plurality of input values of said at least one input query, and wherein said input capturing device is arranged to capture a non-contact input gesture corresponding to said representation, providing an input capturing device presenting said at least one input query with the display means of the user equipment;

capturing a user input in response to said at least one input query with the input capturing device, determining an input value for each user input in accordance with the input interpretation information; and executing at least one action for each input in accordance with the input interpretation information, and wherein:

said customer related information of the management system further comprises at least one customer data field, said template information further comprises at least one prerequisite data field, and the memory has instructions for causing the processor to execute the steps of:

capturing, with the input capturing device, a user input indicative of an event template to be used as a current template, and acquiring template information of the current template from the event template repository;

capturing, with the input capturing device, a user input indicative of at least one participant of the event corresponding to the at least one customer in the management system, and acquiring said at least one customer data field of the at least one participant from the management system based on the at least one prerequisite data field of the current template, wherein said at least one input query and said input interpretation information are of the current template, and wherein said at least one action comprises:

storing at least one input value to the event data field of the management system corresponding to the input query associated to each of the input values; and/or generating a report including a textual representation of at least one input value, the acquired at least one customer data field, or both, and storing said report in a report repository.

* * * * *